United States Patent [19]

Faust

[11] Patent Number: 5,690,861
[45] Date of Patent: Nov. 25, 1997

[54] COUPLING OF POLYMERS MADE BY CATIONIC POLYMERIZATION

[75] Inventor: Rudolf Faust, Lexington, Mass.

[73] Assignee: University of Massachusetts Lowell, Lowell, Mass.

[21] Appl. No.: 398,953

[22] Filed: Mar. 2, 1995

[51] Int. Cl.$^6$ .................... C08F 10/10; C08F 297/00; C08F 293/00
[52] U.S. Cl. .................... 525/319; 525/314; 525/316
[58] Field of Search .................... 525/314, 316, 525/319

[56] References Cited

U.S. PATENT DOCUMENTS

| | | | |
|---|---|---|---|
| 5,219,948 | 6/1993 | Storey et al. | 525/314 |
| 5,395,885 | 3/1995 | Kennedy et al. | 525/98 |
| 5,428,111 | 6/1995 | Faust et al. | 525/314 |
| 5,451,647 | 9/1995 | Faust | 526/147 |
| 5,458,796 | 10/1995 | Storey et al. | 252/58 |

OTHER PUBLICATIONS

Kennedy et al., "Correlation between Cationic Model and Polymerization Reactions of Olefins," Institute of Polymer Science, The University of Akron, pp. 1–48 (1973).

Tung et al. "Dilithium Anionic Initiators Based on Double 1,1–Diphenylethylene Compounds," *Macromolecules*, 11(3):616–617 (1978).

Quirk et al., "Anionic Synthesis of Hetero Three–Armed Star Polymers Via 1,1–Diphenylethylene–Functionalized Macromonomers," Institute of Polymer Science, The University of Akron, pp. 578–579.

Hasegawa et al., "Selective Dimerization of Disobutylene by Oxo Acids: Synthesis of Isobutylene Tetramer," *Journal of Applied Polymer Science*, 27:171–181 (1982).

*Primary Examiner*—Irina Zemel
*Attorney, Agent, or Firm*—Hamilton, Brook, Smith & Reynolds, P.C.

[57] ABSTRACT

A method for coupling a cationic polymer includes forming a reaction mixture of a cationic polymer and a bis(diphenylethylene). The reaction mixture is exposed to a temperature which causes the bis(diphenylethylene) to react with the cationic polymer, thereby coupling to cationic polymer. In another embodiment, the method includes forming a reaction mixture of an oxo-acid and a isopropenyl polyisobutylene. The reaction mixture is exposed to a temperature below about −30° C., whereby the oxo-acid reacts with isopropenyl polyisobutylene, thereby coupling the polymer.

11 Claims, 4 Drawing Sheets

COUPLING OF POLYMERS MADE BY CATIONIC POLYMERIZATION

BACKGROUND OF THE INVENTION

Polymers are formed from a wide variety of organic compounds. Further, they are employed in many commercial applications, some of which have very specific requirements. For example, some uses demand polymer materials of extremely high purity, or within a narrow molecular weight range. Other applications, such as many industrial uses, employ polymers as reactants for further conversion to compositions having particular properties. Additionally, some applications require particular polymer configurations, such as A-B-A type triblock copolymers, wherein one monomeric repeat unit includes a second monomeric repeat unit at either end of a linear polymer.

However, polymerization reactions typically are difficult to control. Even at constant reaction conditions, resulting polymers commonly have broad ranges of molecular weight. Further, during polymerization, polymer chains can undergo chain transfer and side reactions. These polymer products consequently have a molecular structure which are ill-defined and which do not allow the physical properties of the material to be manipulated, such as by application of heat, or by mechanical force, and which limit the potential of the polymer as a reactant for production of related compounds.

One attempt to control the molecular weight ranges and molecular structure of polymers has been to employ living polymerizations. These are polymerizations which proceed with the absence of termination and chain transfer. As a consequence, living polymerizations generally yield polymers with well defined structure, controlled molecular weight, and narrow molecular weight distribution.

However, some manipulations of polymers which have been formed by carbocationic living polymerization have not been readily obtained. For example, coupling of polymers formed by carbocationic polymerization has generally been unachievable.

Therefore, a need exists for a method of coupling polymers formed by carbocationic living polymerization.

SUMMARY OF THE INVENTION

The present invention relates to a method for coupling polymers made by cationic polymerization.

In one embodiment, a reaction mixture is formed of a cationic polymer and a bis(diphenylethylene) having the formula:

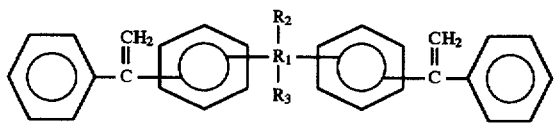

wherein $R_1$ includes at least one carbon, and $R_2$ and $R_3$ are hydrogen or alkyl groups. The reaction mixture is exposed to a temperature which causes the bis(diphenylethylene) to react with the cationic polymer, thereby coupling the cationic polymer.

In another embodiment, a reaction mixture is formed of an oxo-acid and isopropenyl polyisobutylene. The reaction mixture is exposed to a temperature below about −30° C., whereby the oxo-acid reacts with the isopropenyl polyisobutylene, thereby coupling the isopropenyl polyisobutylene.

The present invention has many advantages. For example, asymmetric telechelic polymers, which have been formed by carbocationic polymerization, can be coupled. The resulting coupled telechelic polymers are symmetric and have a controlled molecular weight and a narrow molecular weight distribution. An example of a polymer which can be formed by the method of the invention is an A-B-A type triblock copolymer which has been formed by coupling A-B type asymmetric telechelic cationic polymers. Particular examples of coupled polymers which can be formed by the method of the invention include emulsifiers, compatibilizers, and thermoplastic elastomers.

DETAILED DESCRIPTION OF THE INVENTION

Figure 1:
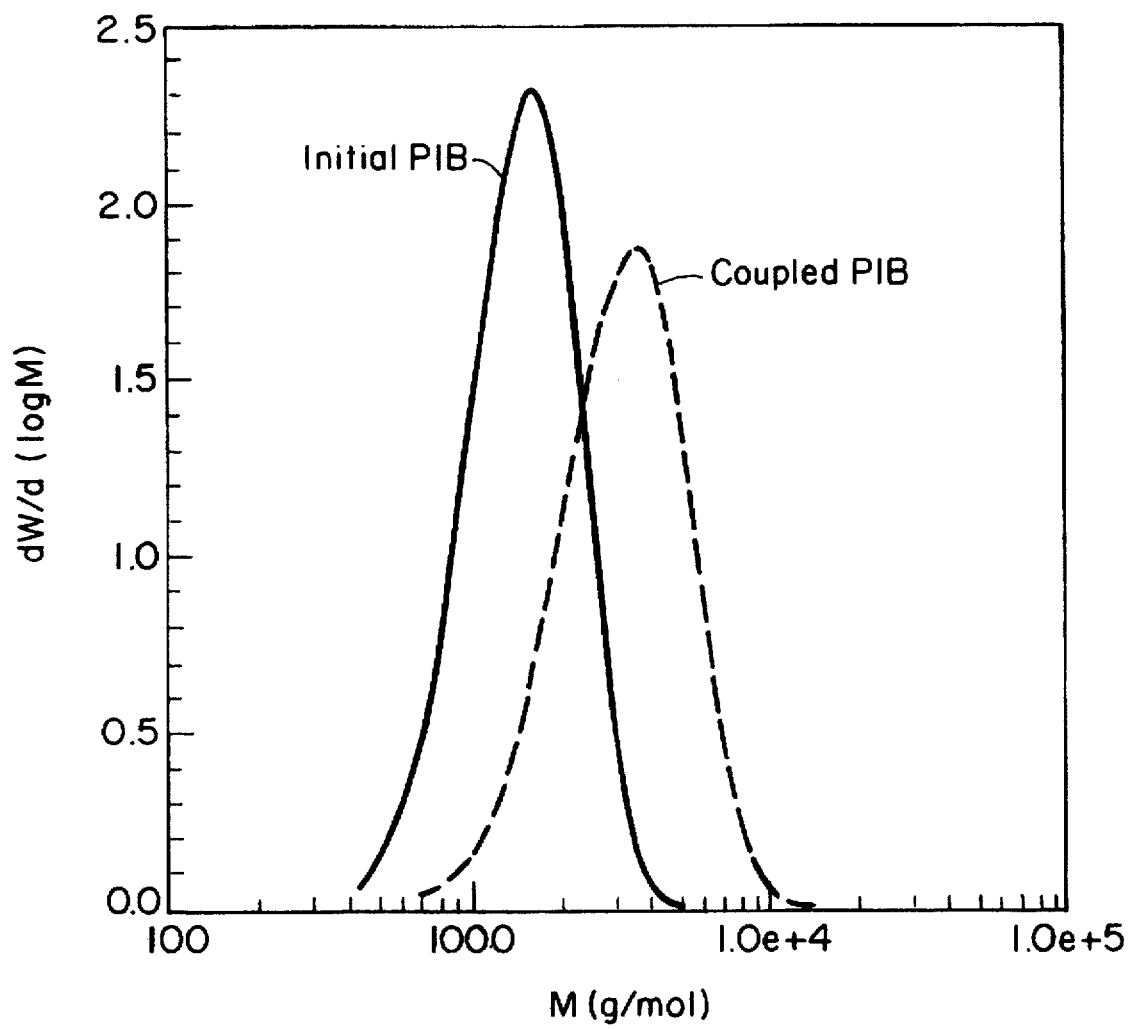
FIG. 1 is a series of gel-permeation chromatograph (GPC) plots of polyisobutylene coupled with bis[4-(1-phenylethenyl)phenyl]propane, which was formed by the method of the invention, and wherein the molar ratio of polyisobutylene to bis[4-(1-phenylethenyl)phenyl]propane is about 1:2.

The features and other details of the invention will now be more particularly described with reference to the accompanying tables and pointed out in the claims. It will be understood that the particular embodiments of the invention are shown byway of illustration and not as limitations of the invention. The principle feature of this invention can be employed in various embodiments without departing from the scope of the invention.

This invention relates to a method for coupling cationic polymers. A "cationic polymer," as defined herein, means a polymer which includes a net positive charge at an end group of the polymer. "Coupling," as defined herein, means chemically linking two polymer molecules together to form a single molecule.

In one embodiment, the method includes forming a reaction mixture of a cationic polymer and a bis (diphenylethylene). The bis(diphenylethylene) has the following general empirical formula:

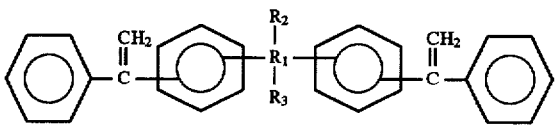

The phenyl (Ph) groups can include substituents, such as alkyl, hydrogen, or other functional groups. $R_1$ includes at least one carbon. $R_2$ and $R_3$ include hydrogen or alkyl groups. In a particularly preferred embodiment, the bis (diphenylethylene) is 2,2 bis[4-(1-phenylethenyl)-phenyl] propane [BPEPP], which has the following structural formula:

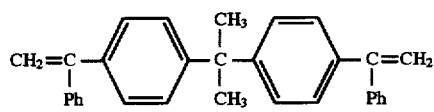

Generally, the cationic polymer is a telechelic asymmetric cationic polymer. As defined herein, a "telechelic polymer" means a linear polymer that is substituted with functional groups at both ends. A telechelic polymer in which these functional substituents are different is "asymmetric," while a "symmetric" telechelic polymer is one with identical substituents at both ends. Embodiments of the present invention include both symmetric and asymmetric telechelic polymers.

Examples of suitable cationic polymers include those which are disclosed in copending U.S. application Ser. No. 08/173,493, the teachings of which are incorporated herein in their entirety. Preferred examples of suitable cationic polymers include polyisobutylene (PIB) and polystyrene. Further, the number of repeat units in the polyisobutylene is generally greater than about two.

The reaction mixture of the cationic polymer and the bis(diphenylethylene) is exposed to a temperature which causes the bis(diphenylethylene) to react with the cationic polymer, thereby coupling the cationic polymer. Typically, the temperature to which the reaction mixture is exposed is in a range of between about −100° C. and 0° C. Preferably the temperature is in a range of between about −100° and −30° C. In a particularly preferred embodiment, the temperature to which the reaction mixture is exposed is about −80° C.

The molar ratio of the bis(diphenylethylene) to the cationic polymer is sufficient to cause coupling of the cationic polymer at the temperature to which the reaction mixture is exposed. In one embodiment the molar ratio of the bis (diphenylethylene) to the cationic polymer is in the range of between about 1:1 and 1:2. Preferably the molar ratio of the bis(diphenylethylene) to the cationic polymer is about 1:2.

In one embodiment, the cationic polymer is a block copolymer. For example, the cationic polymer can be a diblock copolymer, whereby coupling of the cationic polymer by the method of the invention causes formation of a A-B-A type triblock copolymer.

In a specific embodiment, the cationic polymer is a polyisobutylene and wherein the bis(diphenylethylene) is 2,2 bis[4-(1-phenylethenyl)phenyl]propane. In this particular embodiment, the reaction mixture can include, in addition to the polyisobutylene and the 2,2 bis[4-(1-phenylethenyl)phenyl]propane, methyl chloride and hexane as a solvent base, wherein the methyl chloride comprises about 40% by weight of the solvent base and hexane comprises about 60% of the solvent base. The overall mechanism of the reaction is believed to be as follows:

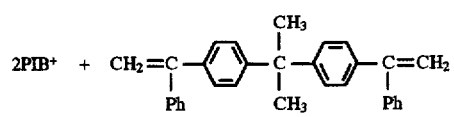

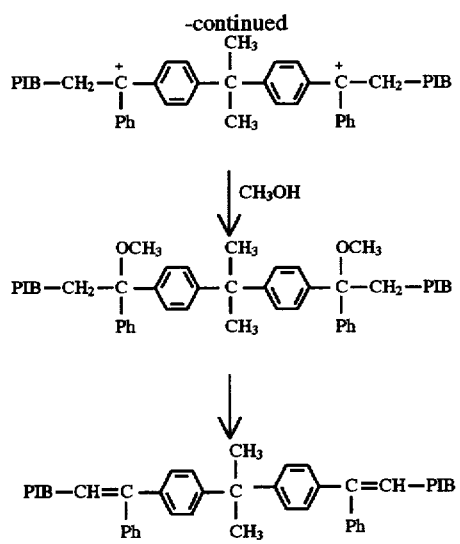

The reaction period for coupling is sufficient to cause a substantial portion of the cationic polymers to couple. The resulting coupled cationic polymer can be separated from the reaction mixture by a suitable technique, such as by evaporation of the solvent, etc. If the coupled cationic polymer is subsequently reacted with another reactant, such as methanol, the resulting reaction product can be separated by the same method, or by some other suitable method.

In an alternate embodiment, the method includes forming a reaction mixture of an oxo-acid and isopropenyl polyisobutylene. The isopropenyl polyisobutylene has the following structural formula:

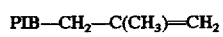

PIB—CH$_2$—C(CH$_3$)=CH$_2$

Examples of suitable oxo-acids are triflic acid and perchloric acid. A preferred oxo-acid is triflic acid.

Preferably the isopropenyl polyisobutylene has a repeating isobutylene unit of at least two. In a particularly preferred embodiment, the isopropenyl polyisobutylene includes a repeating unit of at least about nine.

The reaction mixture is formed at a temperature below about −30° C., whereby the oxo-acid reacts with the isopropenyl polyisobutylene, thereby coupling the isopropenyl polyisobutylene. In a specific embodiment, the reaction mixture is formed at a temperature below about −50° C. to cause coupling of the isopropenyl polyisobutylene. Preferably, the reaction mixture is formed at a temperature of about −80° C. The reaction mixture typically includes a relatively non-polar solvent, such as hexane and a low concentration of acid. It is believed that the following reaction products are formed:

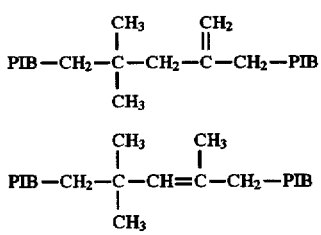

The invention will now be further and more specifically described with regard to the following examples. All parts and percentages are by weight unless otherwise specified.

EXEMPLIFICATION

A. Materials 2.2 Bis[4-(1-phenylethenyl)phenyl]propane (BPEP) was obtained according to a procedure described by Tang, Lo and Bener (L. H. Tang, G. S. Lo, D. E. Bener, Macromolecules:11, 616, 1978). Finely powdered anhydrous $AlCl_3$ (0.062 mole, 8.3 g), anhydrous $CH_2CL_2$ (100 mL, distilled from $P_2O_5$), and $CH_3COCl$ (0.052 mole, 3.73 mL) were cooled to –15° C. To this stirred solution, 2,2-diphenylpropane (I) (0.022 mole) in 50 mL $CH_2Cl_2$ was added dropwise over 20 min. The temperature was maintained at –15° C. to –10° C. The mixture was stirred at –10° C. to +5° C. for approximately 3 hours, then left standing at room temperature overnight. The resulting dark red solution was poured onto crushed ice, extracted with $CH_2Cl_2$, washed with water until neutral, dried over anhydrous $MgSO_4$ and filtered. The solvent was removed and 5.34 g (80%) of crystalline product 4,4'-diacetyl, 2,2-diphenylpropane (II) was obtained. Finally, the product was purified by recrystallization from diethylether.

PhMgBr (3M in ether, 0.23 mole) was cooled to –10° C. and (II) in 50 mL anhydrous benzene was added dropwise while stirring during 45 min. at –10° C. The mixture was stirred for 1 h, then poured onto a mixture of (100 g) crushed ice and (6 mL) concentrated $H_2SO_4$. The organic layer was separated, washed with water until neutral dried over $MgSO_4$ and filtered. The solvent was removed by rotary evaporator at room temperature to give 6.5 g 4,4'-bis (1-phenyl-1-hydroxyethyl) diphenyl propane (III) as a pale amber gum.

A solution of (III) (0.011 mole) in xylene (100 mL) containing 10 drops of $H_3PO_4$ was refluxed for 3 hours and the water formed during the reaction was collected in a Dean-Stark trap. The xylene was removed and the product 2,2 bis[4-(1-phenylethenyl)phenyl]propane (IV) was diluted with cyclohexane. The solution was purified by flash chromatography using a 2 cm×15 cm of 100–200 mesh 60, a silica gel (commercially available from Aldrich, Inc.) column, and hexane as the eluent. The effluent was monitored by a short wave UV source and silica gel TLC plates containing fluorescent indicator. The sample was collected at the first sign of UV absorbing material being eluted from the column (the sample eluted between 150–200 mL). This effluent was collected and reduced to a viscous liquid by rotary evaporator. This chromatography step was then repeated. The product was recrystallized from methanol, yield=80%, m.p.=80.6° C. The $^1H$ NMR spectrum of the product exhibited a multiplet at 7.2 ppm (18 aromatic protons), a doublet at 5.4 ppm (4 vinyl protons) and a triplet at 1.7 ppm (6 methyl protons).

B. Procedures

1. Synthesis of ω-isopropenyl-PIB

PIB carrying tert-chloro termini (PIB-Cl) was obtained using the $TMPCl/BCl_3/IB/DTBP/CH_3Cl/$–40° C. system. $M_n$~500 and 1000 polymers with narrow molecular weight distribution were prepared. ω-isopropenyl-PIB was obtained by dehydrochlorination of PIB-Cl. J. P. Kennedy, V. Chang, R. A. Smith and B. Ivan, Polymer Bulletin: 1, 575 (1979). A representative experiment was as follows: in a 500 mL Erlenmeyer flask equipped with stirring bar and condenser 10 g of PIB-Cl (0.0213 mol), 23 g t-BuOK and 300 mL THF (refluxed overnight under nitrogen in the presence of Na-banzophenone) were added. The solution was refluxed for 20 hours and then cooled to room temperature. Subsequently, 150 mL n-hexane was added, stirred for a few minutes, 150 mL distilled water and 50 mL methanol were introduced and stirred for 10 minutes; the organic layer was washed with distilled water and dried with anhydrous magnesium sulfate. Finally, the product was filtered and the solvent was removed by rotavap and dried in vacuo.

2. Dimerization of $PIB\text{-}CH_2\text{---}C(CH_3)\text{=}CH_2$

Isopropenyl polyisobutylene was dimerized, using hexane as a solvent, and in the presence of triflic acid at about –80° C.

3. Coupling by bis(diphenylethylene)

Isobutylene was polymerized by 2,4,4 trimethylpentyl-chloride (TMPCl) in conjunction with titanium tetrachloride ($TiCl_4$) in the presence of ditertiarybutylpyridine (DTBP) in methylchloride and hexane at a volume:volume ratio of 4:6 at –80° C. When the isobutylene polymerization was complete, 2,2 bis[4-(1-phenylethenyl)-phenyl]propane [BPPEP] was added. At intervals thereafter, the reaction was quenched by the addition of precooled methanol, and the reaction product was isolated by evaporating the reaction solvents.

C. Results and Discussion

FIG. 1 shows GPC RI traces of PIB and the coupled product with BPEPP. Conditions: [IB]=0.54M, 2,4,4 trimethylpentylchloride [TMPCl]=$3\times10^{-2}$M, ditertiarybutylpyridine [DTBP]=$6\times10^{-3}$M, [$TiCl_4$]=$1.2\times10^{-1}$M, MeCl/Hexane-4/6 v/v, Temp.=–80° C., after 1 h polymerization time BPEPP was added (0)-initial, $M_n$=1100, $M_w/M_n$=1.45. (8)-1 h., [BPEPP]/[TMPCl]=0.5, coupled product: $M_n$=2010, $M_w/M_n$=1.35.

According to the molecular weight of the products, diaddition of living PIB to BPEPP is rapid and quantitative.

Figure 2:
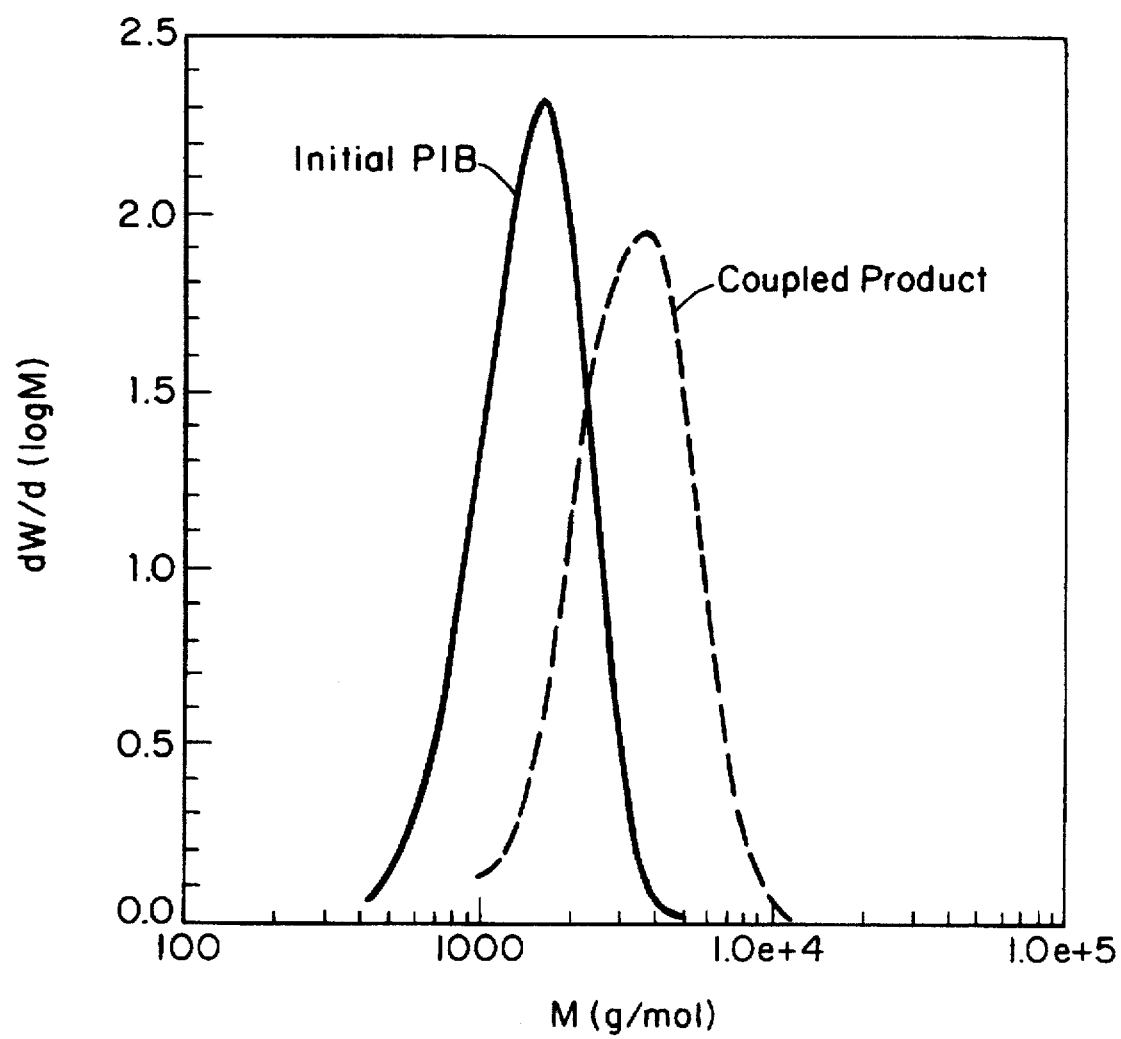
FIG. 2 is a series of GPC plots of polyisobutylene coupled with bis[4-(1-phenylethenyl)phenyl]propane, which was formed by the method of the invention and wherein the molar ratio of polyisobutylene to bis[4-(1-phenylethenyl)phenyl]propane is about 1:1.

Close to quantitative coupling was also observed when the [TMPCl]/[MDDPE]=1 ratio was used as evidenced by size exclusion chromatography, presented in FIG. 2, which shows GPC RI traces of PIB and the coupled product with BPEPP. Conditions: [IB]=0.54M, [TMPCl]=$3\times10^{-2}$M, [DTBP]=$6\times10^{-3}$M, [$TiCl_4$]=$1.2\times10^{-1}$M, MeCl/Hexane-4/6 v/v, Temp.=–80° C., after 1 h polymerization time BPEPP was added (0)-initial, $M_n$=1100, $M_w/M_n$=1.45. (12)-1 h., [BPEPP]/[TMPCl]=1, coupled product: $M_n$=2060, $M_w/M_n$=1.39.

For dimerization of PIB olefins, two samples of $M_n$=500 and $M_n$=1000 g/mol were used.

At –80° C., using low concentration of oxo-acid, dimerization of PIB macromer proceeded and the extent of dimerization increased with time.

Figure 3:
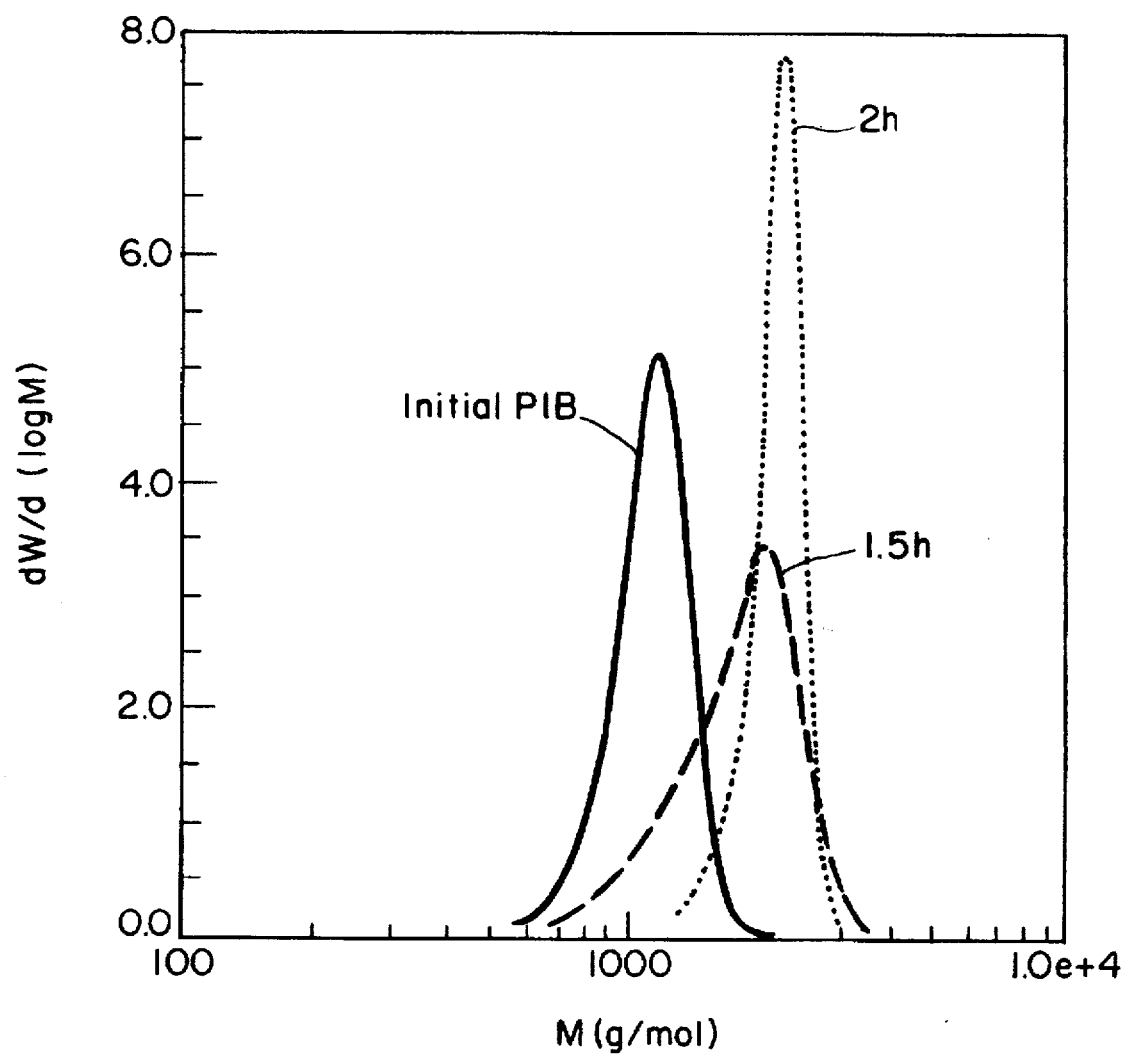
FIG. 3 is a series of GPC plots of an isopropenyl polyisobutylene macromer and of the coupled product, which was formed in the presence of triflic acid according to the method of the invention.

FIG. 3 shows GPC RI traces of the product obtained in the dimerization with triflic acid. [PIB olefin]=0.4M, [$CF_3SO_3H$]=10 mM, Temp.=–80° C., solvent hexane, (0)-initial, $M_n$=1050 $M_w/M_n$=1.11, (7)-1.5 h. $M_n$=1600 $M_w/M_n$=1.28, (3)-2 h $M_n$=2180 $M_w/M_n$=1.06.

Figure 4:
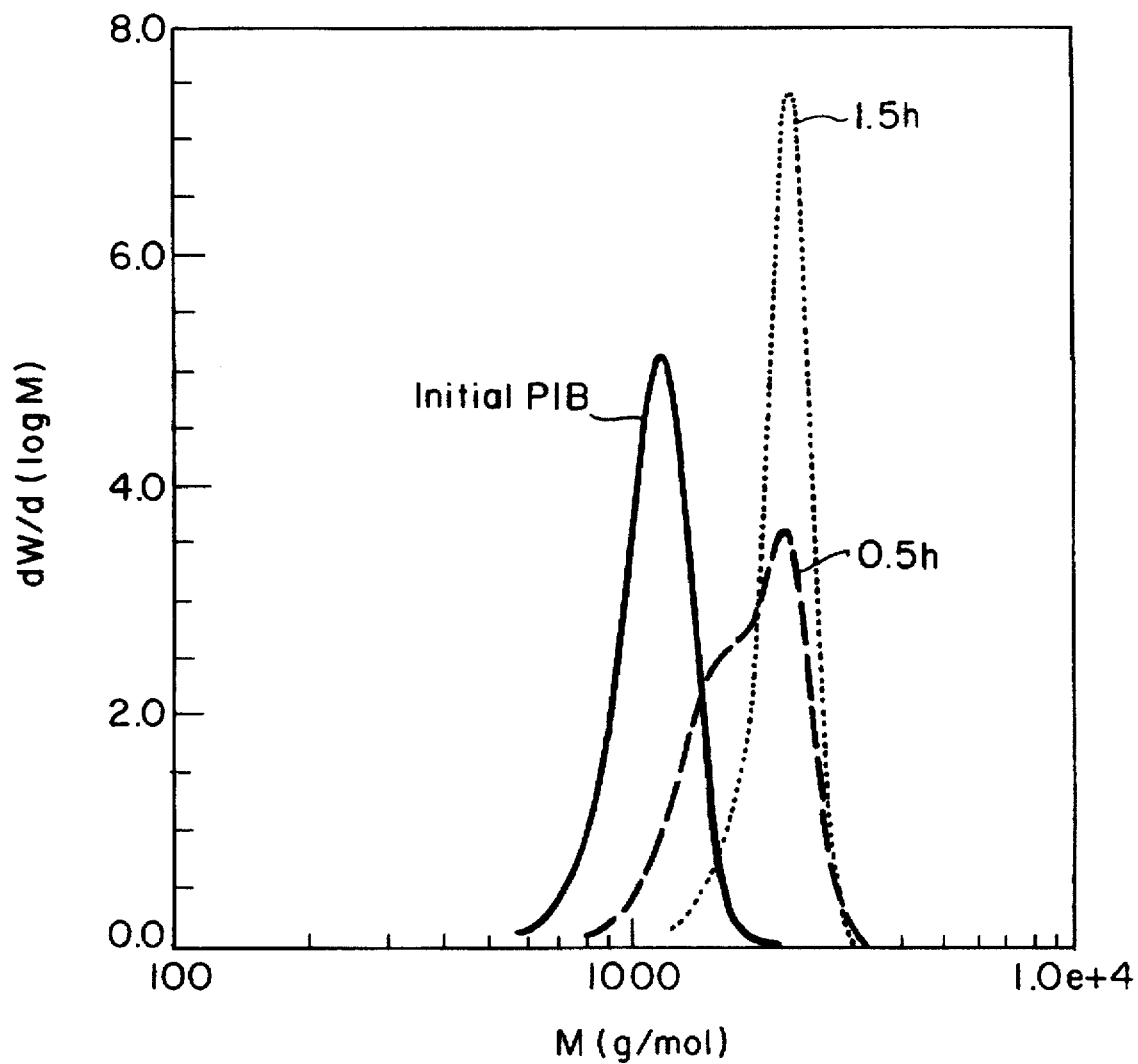
FIG. 4 is another series of GPC plots of an isopropenyl polyisobutylene macromer, and of the coupled product, which was formed in the presence of triflic acid.

FIG. 4 shows GPC RI traces of the products dimerization with triflic acid [PIB olefin]=0.5M, [$CF_3SO_3H$]=10 mM, Temp.=–80° C., solvent hexane, (0)-initial, $M_n$=1050 $M_w/M_n$=1.11, (1)-0.5 h. $M_n$=1700 $M_w/M_n$=1.22, (3)-1.5 h $M_n$=2160 $M_w/M_n$=1.04.

The results demonstrate that quantitative dimerization of PIB olefin can be achieved in a non-polar solvent at –80° C. by using 0.5M (complete dimerization after 1.5 h) or 0.4M concentration (complete dimerization after 2 h).

Equivalents

Those skilled in the art will recognize, or be able to ascertain using no more than routine experimentation, many equivalents to the specific embodiments of the invention described specifically herein. Such are intended to be encompassed by the following claims.

I claim:
1. A method for coupling a cationic polymer, comprising the steps of:
   a) forming a reaction mixture of a cationic polymer and a bis(diphenylethylene) having the formula:

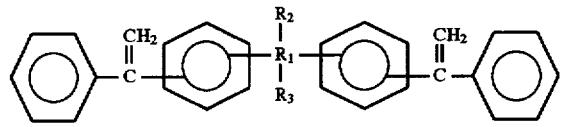

wherein $R_1$ includes at least one carbon, and $R_2$ and $R_3$ are hydrogen or alkyl groups; and
   b) exposing the reaction mixture to a temperature which causes the bis(diphenylethylene) to react with the cationic polymer, thereby coupling said cationic polymer.

2. The method of claim 1 wherein the bis(diphenylethylene) is 2,2 bis[4-(1-phenylethenyl)phenyl]propane.

3. The method of claim 1 wherein the cationic polymer is polyisobutylene.

4. The method of claim 3 wherein the number of repeat units in the polyisobutylene is greater than about two.

5. The method of claim 1 wherein the cationic polymer is polystyrene.

6. The method of claim 1 wherein the temperature to which the reaction mixture is exposed is in a range of between about −100° C. and 0° C.

7. The method of claim 6 wherein the temperature to which the reaction mixture is exposed is between about −100° C. and −30° C.

8. The method of claim 7 wherein the temperature to which the reaction mixture is exposed is about −80° C.

9. The method of claim 1 wherein the cationic polymer is a block copolymer.

10. The method of claim 9 wherein the cationic polymer is a diblock copolymer, whereby a coupled cationic polymer is formed that is an A-B-A type block copolymer.

11. The method of claim 1 wherein the molar ratio of the bis(diphenylethylene) to the cationic polymer is in a range of between about 1:1 and 1:2.

* * * * *